UNITED STATES PATENT OFFICE.

OTTO SCHMIDT, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY.

PRODUCING AROMATIC AMINS AND CATALYSTS THEREFOR.

1,207,802.     Specification of Letters Patent.     Patented Dec. 12, 1916.

No Drawing.     Application filed October 21, 1914. Serial No. 867,715.

*To all whom it may concern:*

Be it known that I, OTTO SCHMIDT, a citizen of the German Empire, residing at Ludwigshafen-on-the-Rhine, Germany, have invented new and useful Improvements in Producing Aromatic Amins and Catalysts Therefor, of which the following is a specification.

The specification of German Patent No. 139,457 describes the production of anilin and homologues thereof by passing the corresponding nitro compounds, in the form of vapor, together with hydrogen over heated copper, nickel, cobalt, iron, or platinum and of these copper is particularly recommended, it being stated that it may be used in the form of fine shavings, or of copper dust, or as obtained by the reduction of black copper oxid and at a temperature of from 300° to 400° C. and, according to the said specification a temperature of from 300° to 400° C. should be employed during the reduction of the aromatic nitro compounds. I have found that when such temperatures are employed, decomposition takes place, and that it is not possible, according to the said process, to carry out the reaction continuously for the production of a good yield of pure aromatic amins. The said process has not come into commercial use and the patent was allowed to lapse.

I have found that catalytic agents containing copper prepared pyrogenetically from a salt thereof and a body promoting the action of the said copper are considerably more active for the purpose of manufacturing aromatic amins. I prefer to employ a low temperature while producing the copper pyrogenetically from a salt thereof and, if necessary, I can employ a reducing gas such, for instance, as carbon monoxid, or hydrogen. As suitable copper salts, I mention copper carbonate, copper formate, copper oxalate, and copper nitrate, or mixtures of such salts with ammonium carbonate, or similar salts, may be used. When employing copper formate for the said preparation it is not necessary to employ a reducing gas. During the production of the catalytic agent it is preferred to avoid temperatures above 300° C. and in many cases an intermediate formation of copper oxid takes place. The copper obtained, in admixture with the body promoting its action, can either be employed as such, or the mixture can be placed on carriers, for instance, pumice, asbestos and kieselguhr. As instances of compounds which promote the activity of the pyrogenetic copper I mention, for instance, alkali compounds, magnesia, aluminium oxid, and other metallic oxids; such promoters are, for instance, mentioned in the application for British Patent No. 2306 A. D. 1914. Other suitable bodies which promote the activity of the pyrogenetic copper include other heavy metals or compounds thereof, for instance, an oxid, or salt, of iron, silver, zinc or the like. The addition of the body which will promote the reaction may be made to the copper salt before the pyrogenetic conversion thereof, or such bodies may be added to the copper oxid intermediately obtained, or even to the finely divided copper itself.

According to the present invention it is possible to effect the reduction of aromatic nitro compounds at comparatively low temperatures, for instance at 200° C., or less, and a good yield of pure amin can be obtained and the process be carried on continuously. It is preferred to avoid high temperatures during the reduction as they tend to give rise both to less pure products and to lessen the activity of the contact masses.

In order to effect the reduction of the nitro compound, it may be passed over a catalytic mixture as hereinbefore described together with hydrogen, under which term I include gas mixtures containing hydrogen, and I have found that water-gas, or other gas mixture containing carbon monoxid and hydrogen, is also useful for the purposes of this invention and that the carbon monoxid assists in the reduction notwithstanding the low temperatures which may be used in carrying out the process.

The following examples will serve to illustrate further the nature of this invention, which, however, is not confined to these examples. The parts are by weight.

Example 1: Mix together, to a paste, 130 parts of pumice, 25 parts of copper oxalate, 1 part of magnesium oxid and a little water. Then dry the mass in an oven and heat it to about 200° C. and pass a current of hydrogen over it. Then, at a temperature of from 200°, to 220°, C., pass a mixture of ortho-nitro-toluene vapor and hydrogen over the contact mass, and cool the resulting gases. A mixture of ortho-toluidin and water is obtained. The ortho-toluidin can be separated in the usual, or any suitable, manner.

Example 2: Prepare a paste from 130 parts of pumice and a mixture of 20 parts of a 40 per cent. sodium silicate solution, 24.3 parts of copper carbonate, 2.7 parts of zinc carbonate and a little water. Introduce the mass into a furnace and reduce it, with hydrogen, at from 180° to 200° C. and then pass over the catalytic agent a mixture of nitrobenzene vapor with excess of hydrogen while maintaining an internal temperature of about 200° C. Cool the gases as they leave the furnace. A mixture of anilin and water is obtained, from which the anilin can be separated and obtained practically pure and in quantitative yield, while the catalytic agent retains its activity for a long period.

Example 3: Prepare a paste from 130 parts of pumice and a mixture of 20 parts of a 40 per cent, sodium silicate solution, 27 parts of copper carbonate, 3 parts of iron carbonate and a little water and reduce the mass, in a furnace, with hydrogen at from 200° to 210° C. The catalytic agent can be employed for the reduction of nitrobenzene as described in the foregoing Example 2. In a similar manner other aromatic nitro compounds can be reduced and, if desired, other mixtures containing copper produced pyrogenetically from its salts can be employed.

Example 4: Mix together 130 parts of pumice, 24 parts of a mixture containing 90 per cent. of copper carbonate and 10 per cent. of zinc carbonate and 20 parts of a 40 per cent. solution of water-glass, while employing a little water; then dry the mass and reduce it in a furnace, at about 200° C., by means of purified water-gas, and then while employing a temperature of from 190° to 220° C. pass through the furnace a current containing nitrobenzene vapor and purified water-gas. On cooling the gases which leave the furnace, a mixture of anilin and water is obtained from which the anilin can be separated in any suitable way.

Now what I claim is:—

1. The process of producing an aromatic amin by passing the vapors of the corresponding nitro compound together with hydrogen over a catalytic agent containing copper prepared pyrogenetically from a salt thereof and a body promoting the action of the said copper.

2. The process of producing an aromatic amin by passing the vapors of the corresponding nitro compound together with hydrogen and carbon monoxid over a catalytic agent containing copper prepared pyrogenetically from a salt thereof and a body promoting the action of the said copper.

3. The process of producing an aromatic amin by passing the vapors of the corresponding nitro compound together with hydrogen over a catalytic agent containing copper prepared pyrogenetically from a salt thereof and a body containing zinc.

4. The process of producing an aromatic amin by passing the vapors of the corresponding nitro compound together with hydrogen and carbon monoxid over a catalytic agent containing copper prepared pyrogenetically from a salt thereof and a body containing zinc.

5. The process of producing anilin by passing vaporized nitrobenzene together with hydrogen over a catalytic agent containing copper prepared pyrogenetically from a salt thereof and a body promoting the action of the said copper.

6. The process of producing anilin by passing vaporized nitrobenzene together with hydrogen and carbon monoxid over a catalytic agent containing copper prepared pyrogenetically from a salt thereof, and a body containing zinc.

In testimony whereof I have hereunto set my hand in the presence of two subscribing witnesses.

OTTO SCHMIDT.

Witnesses:
 MARX BUCH, Jr.,
 RUPERT LAUFER.